(12) United States Patent
Kim et al.

(10) Patent No.: US 7,336,704 B2
(45) Date of Patent: Feb. 26, 2008

(54) METHOD AND CIRCUIT FOR UPDATING A TAP COEFFICIENT OF A CHANNEL EQUALIZER

(75) Inventors: Min-Ho Kim, Suwon (KR); Jung-Min Choi, Seoul (KR); Jong-Wha Chong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 693 days.

(21) Appl. No.: 10/758,027

(22) Filed: Jan. 16, 2004

(65) Prior Publication Data
US 2004/0228398 A1    Nov. 18, 2004

(30) Foreign Application Priority Data
Jan. 21, 2003    (KR)    ............. 10-2003-0004023

(51) Int. Cl.
*H03K 5/159*    (2006.01)

(52) U.S. Cl. .................................. 375/232
(58) Field of Classification Search ........... 375/229, 375/232
See application file for complete search history.

(56) References Cited

U.S. PATENT DOCUMENTS 5,541,956 A * 7/1996 Ueda ........................ 375/232

FOREIGN PATENT DOCUMENTS

JP    2000091965 A * 3/2000
JP    2001196978    7/2001

OTHER PUBLICATIONS

Korean Patent Office Action dated Nov. 26, 2004, Korean Appl. No. 10-2002-0004023.

* cited by examiner

*Primary Examiner*—David C. Payne
*Assistant Examiner*—Leon Flores
(74) *Attorney, Agent, or Firm*—Harness, Dickey & Pierce, P.L.C.

(57) ABSTRACT

Provided are a method of updating a tap coefficient of a channel equalizer while reducing the number of calculations and the divergence, and a circuit arranged and configured to execute the method. The method includes evaluating whether or not an error of the channel equalizer converges within a range of a threshold of visibility and determining the status of a control signal to select whether the tap coefficient of the channel equalizer will be updated using a least mean square (LMS) algorithm or a Kalman algorithm, wherein the LMS algorithm is the default error correction means and the Kalman algorithm is utilized when the control signal indicates the presence of a training signal.

17 Claims, 3 Drawing Sheets

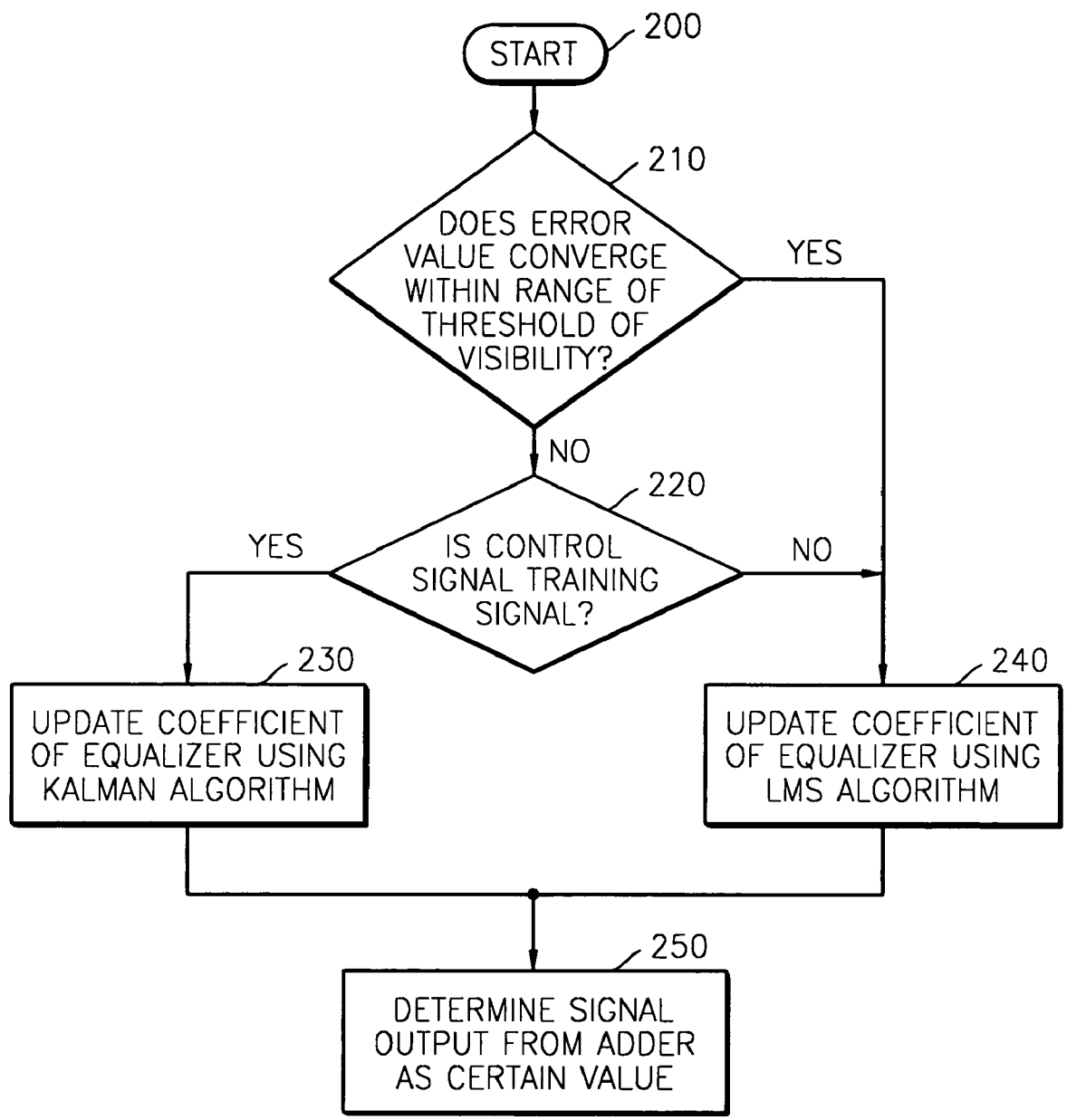

METHOD AND CIRCUIT FOR UPDATING A TAP COEFFICIENT OF A CHANNEL EQUALIZER

This application claims priority from Korean Patent Application No. 10-2003-0004023 filed on Jan. 21, 2003, in the Korean Intellectual Property Office (KIPO), the entire contents of which are incorporated herein by reference.

BACKGROUND OF THE INVENTION

1. Field of the Invention

The present invention relates to a method of updating coefficients in a channel equalizer and a coefficient updating circuit, and more particularly, to a method of updating coefficients in a channel equalizer using either the Kalman algorithm or the least mean square (LMS) algorithm, and a circuit that may be used to perform the method.

2. Description of the Related Art

Channel equalization is a technique of processing a signal, such as a signal used in digital communication systems, to improve the performance by reducing channel noise, channel distortion, multi-path interference and multi-user interference. Channel equalizers are used mainly in household appliances such as digital TVs and personal communication systems in order to increase the ratio of an input signal relative to interference and thereby reduce the symbol error rate of the input signal.

Advanced Television Systems Committee (ATSC) provides standards for digital high-definition television (HD TV). ATSC document A53B of Aug. 7, 2001, describes approved standards for digital TV and ATSC document A54, Oct. 4, 1995, provides guidelines for the use of these standards. The standards specify specific training sequences that may be incorporated into video signals transmitted by terrestrial broadcast, cable or satellite channel. ATSC document A54 also discloses a method for adapting the filtering response of an equalizer to adequately compensate for channel distortion. This method does not, however, fully account for the higher probability that coefficients for the equalizer are not set at levels sufficient to adequately compensate for channel distortion when the equalizer first operates.

In order to force the convergence of the equalizer's coefficients, a training sequence may be transmitted to and processed by the adaptive equalizer to generate an output signal. This output signal may then be compared with a locally generated or stored version of the expected output signal to generate an error signal. The equalizer coefficients are then adjusted to minimize the value of the error signal, thereby improving the ability of the equalizer to filter an input signal.

A linear filter is typically used for equalizing a channel, but a feedback-type non-linear filter may also be used to remove impulse noise and non-linear distortion occurring in a communication channel and further improve the performance of the equalizer.

The conventional least mean square (LMS) algorithm, which is both relatively simple to implement and requires a relatively small amount of calculation, may be used as an algorithm for updating a tap coefficient of the equalizer. However, although the coefficients may be calculated with a small amount of calculation when using the LMS algorithm, the convergence of the coefficients is relatively slow. Thus, the LMS algorithm is generally unsuitable for a multi-path communication environment in which the speed of and a delay in transmission of data increase.

The Kalman algorithm is a representative algorithm having relatively fast convergence characteristics. The Kalman algorithm however, presents application difficulties because it requires a large amount of calculation. Although advances in hardware have enabled the wider use of the Kalman algorithm, the large amount of calculation and divergence of coefficients remain problematic for applications of the Kalman algorithm.

SUMMARY OF THE INVENTION

The exemplary embodiments of the present invention provide a method for updating a tap coefficient for a channel equalizer, while reducing the amount of calculation and reducing the likelihood of diverging coefficients and an embodiment circuit therefore performing the method. The method includes determining whether or not an error of the channel equalizer converges within a range of a threshold of visibility and updating the tap coefficient of the channel equalizer using 1) the least mean square (LMS) algorithm when the error converges within the range of the threshold of visibility or 2) using either the LMS algorithm or the Kalman algorithm in response to a control signal. When determining the convergence of the error, the square of the error of the channel equalizer is typically compared with the threshold of visibility.

When the updating the tap coefficient of the channel equalizer, the Kalman algorithm is typically used when the control signal is a training signal and the LMS algorithm is typically used for other signals. The error may be the difference between the training signal and a signal output from the channel equalizer in response to the training signal or may be the difference between the signal output from the channel equalizer and a signal output from a determination circuit where the determination circuit determines the signal output from the channel equalizer as a certain value.

Exemplary embodiments of the present invention provide a circuit useful for updating a tap coefficient for a channel equalizer comprising a convergence examining and comparing unit (CEC unit), which determines whether or not a received error of the channel equalizer converges within the range of a threshold of visibility, and an updating circuit for updating the tap coefficient using the LMS algorithm when the error converges within the range of the threshold of visibility and using either the LMS algorithm or the Kalman algorithm in response to a control signal. The updating circuit typically updates the tap coefficient of the channel equalizer using the Kalman algorithm when the control signal is a training signal and using the LMS algorithm in response to other signals.

When the updating circuit updates the tap coefficient of the channel equalizer using the LMS algorithm, the tap coefficient is updated according to Equation I:

$$c(n)=c(n-1)+\mu e(n)y(n) \qquad (I)$$

wherein c(n) denotes an updated tap coefficient vector of the channel equalizer, c(n−1) denotes a tap coefficient vector of the channel equalizer that is yet to be updated, μ denotes the step size, e(n) denotes an error of the channel equalizer and y(n) denotes data input to the channel equalizer.

When the tap coefficient of the channel equalizer is updated using the Kalman algorithm, the coefficient is updated according to Equation II:

$$c(n)=c(n-1)+K(n)e(n) \qquad (II)$$

wherein c(n) denotes an updated tap coefficient vector of the channel equalizer, c(n−1) denotes a tap coefficient vector of the channel equalizer that is yet to be updated, K(n) denotes a Kalman gain vector, and e(n) denotes an error of the channel equalizer.

The exemplary embodiments of the present invention also provide a circuit for updating a tap coefficient of a channel equalizer, including a slicer, which determines a signal output from the channel equalizer as a certain value; a selection circuit, which outputs a signal output from the slicer or a training signal as a signal output from the channel equalizer, in response to a control signal, the channel equalizer having an updated tap coefficient; a subtracter which subtracts the signal output from the channel equalizer from the signal output from the selection circuit; a CEC unit which compares a threshold of visibility with a signal output from the subtracter and outputs the comparison result; a decoder which decodes the control signal and the comparison result output from the CEC unit and outputs the decoding result; and an updating circuit which updates the tap coefficient of the channel equalizer in response to a signal output from the decoder. The updating circuit updates the tap coefficient of the channel equalizer using the LMS algorithm when an error of the channel equalizer converges within the range of the threshold of visibility or, when the error of the channel equalizer does not converge within the range of the threshold of visibility and the control signal is a training signal using the Kalman algorithm and updates the tap coefficient using the LMS algorithm when the control signal is not the training signal.

BRIEF DESCRIPTION OF THE DRAWINGS

The method and circuits comprising the present invention will become more apparent by describing in detail exemplary embodiments thereof with reference to the attached drawings in which:

FIG. 1 illustrates the memory structure of a conventional error covariance matrix;

FIG. 2 illustrates the memory structure of an error covariance matrix according to an exemplary embodiment of the present invention;

FIG. 4 is a flowchart illustrating a method of updating a coefficient of a channel equalizer, according to an exemplary embodiment of the present invention.

DETAILED DESCRIPTION OF EXEMPLARY EMBODIMENTS

Figure 3:
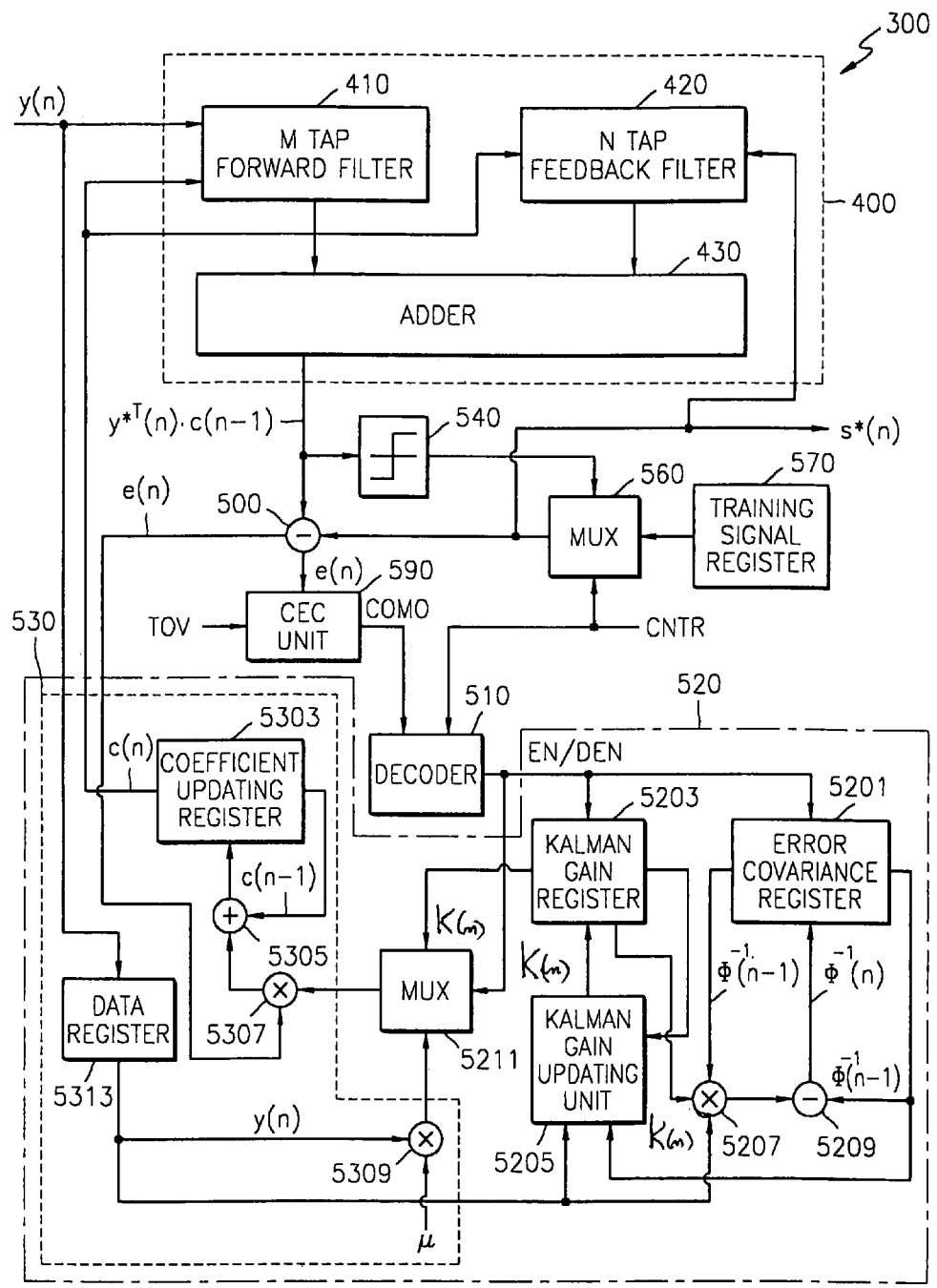
FIG. 3 is a block diagram of a channel equalizer according to an exemplary embodiment of the present invention.

The present invention will now be described more fully with reference to the accompanying drawings, in which exemplary embodiments of the invention are shown. The same reference numerals, if used in different drawings, are intended to represent the same or corresponding elements, and their descriptions will not, therefore, be repeated.

The least mean square (LMS) algorithm requires a small amount of calculation, and stable performance, but has slow convergence characteristics. An error e(n) and an updated coefficient c(n) obtained when applying the LMS algorithm to a channel equalizer can be expressed by the Equations III:

$$e(n)=s^*(n)-y^{*T}(n)c(n-1)$$

$$c(n)=c(n-1)+\mu e(n)y(n)$$

wherein e(n) denotes the difference, i.e., the error, between a training signal, which is generated at a time n by the channel equalizer and a signal which passes through a filtering circuit of the channel equalizer. s*(n) denotes an output of the channel equalizer having an updated coefficient, i.e., a value of an equalized output. $y^{*T}$ denotes data that is input to the channel equalizer and is equivalent to $y^T$, y* denotes a conjugate complex number and $y^T$ denotes a transformation matrix. c(n) denotes a tap coefficient vector at a time n; c(n−1) denotes a tap coefficient vector of the channel equalizer that has yet to be updated; μ denotes the size of a step and y(n) denotes data input to the channel equalizer. When updating a tap coefficient of the channel equalizer using the LMS algorithm, the amount of calculation required is N, N being proportional to the number of taps.

The Kalman algorithm has high-speed convergence characteristics, but requires a large amount of calculation and a large memory capacity, thus increasing the time required to perform the calculations and likelihood of divergence. For instance, when applying the Kalman algorithm to an 8-vestigial side band (VSB) system, the Kalman algorithm guarantees convergence for a short training time in a multi-path channel environment but requires a large amount of calculation and a large memory capacity.

An error e(n) and an updated tap coefficient c(n) obtained when applying the Kalman algorithm to a channel equalizer can be expressed by the Equations IV:

$$K(n)=\phi^{-1}(n-1)y(n)/[1+y^{*T}(n)\phi^{-1}(n-1)y(n)]$$

$$e(n)=s^*(n)-y^{*T}(n)c(n-1)$$

$$c(n)=c(n-1)+K(n)e(n)$$

$$\phi^{-1}(n)=\phi^{-1}(n-1)-K(n)y^{*T}(n)\phi^{-1}(n-1)$$

wherein K(n) denotes a Kalman gain vector, $\phi^{-1}(n)$ denotes an error covariance matrix at a time n, and $\phi^{-1}(n-1)$ denotes an error covariance matrix a time n−1 prior to time n. When updating the tap coefficient of the channel equalizer using the Kalman algorithm, the amount of calculation required is $N^2$ with N being proportional to the number of taps.

Assuming that the formula commonly expressed in the Kalman gain vector of Equation IV is J(n), a transformation formula $J^T(n)$ of the formula J(n) can be expressed by the Equations V:

$$J(n)=\phi^{-1}(n-1)y(n)$$

$$J^T(n)=[y^{*T}(n)\phi^{-1}(n-1)]$$

The Kalman algorithm which can be applied to the channel equalizer according to the present invention can be simplified using Equation V, as shown by Equations VI:

$$J(n)=\phi^{-1}(n-1)y(n)$$

$$K(n)=J(n)/[1+y^{*T}(n)J(n)]$$

$$e(n)=s^*(n)-y^{*T}(n)c(n-1)$$

$$c(n)=c(n-1)+K(n)e(n)$$

$$\phi^{-1}(n)=\phi^{-1}(n-1)-K(n)J^T(n)$$

The amount of calculation of a channel equalizer using the conventional Kalman algorithm of Equations IV is $3N^2$ when the amount of calculation of $\phi^{-1}(n-1)y(n)$ is $N^2$, whereas the amount of calculation of the channel equalizer 300 using the Kalman algorithm of Equations VI, according to an exemplary embodiment of the present invention, will be $N^2$ because J(n) is replaced once with $J^T(n)$. Therefore, the amount of calculation of the channel equalizer 300 using the Kalman algorithm according to the exemplary embodiment of the present invention can be reduced by about two thirds.

Figures 1, 2:
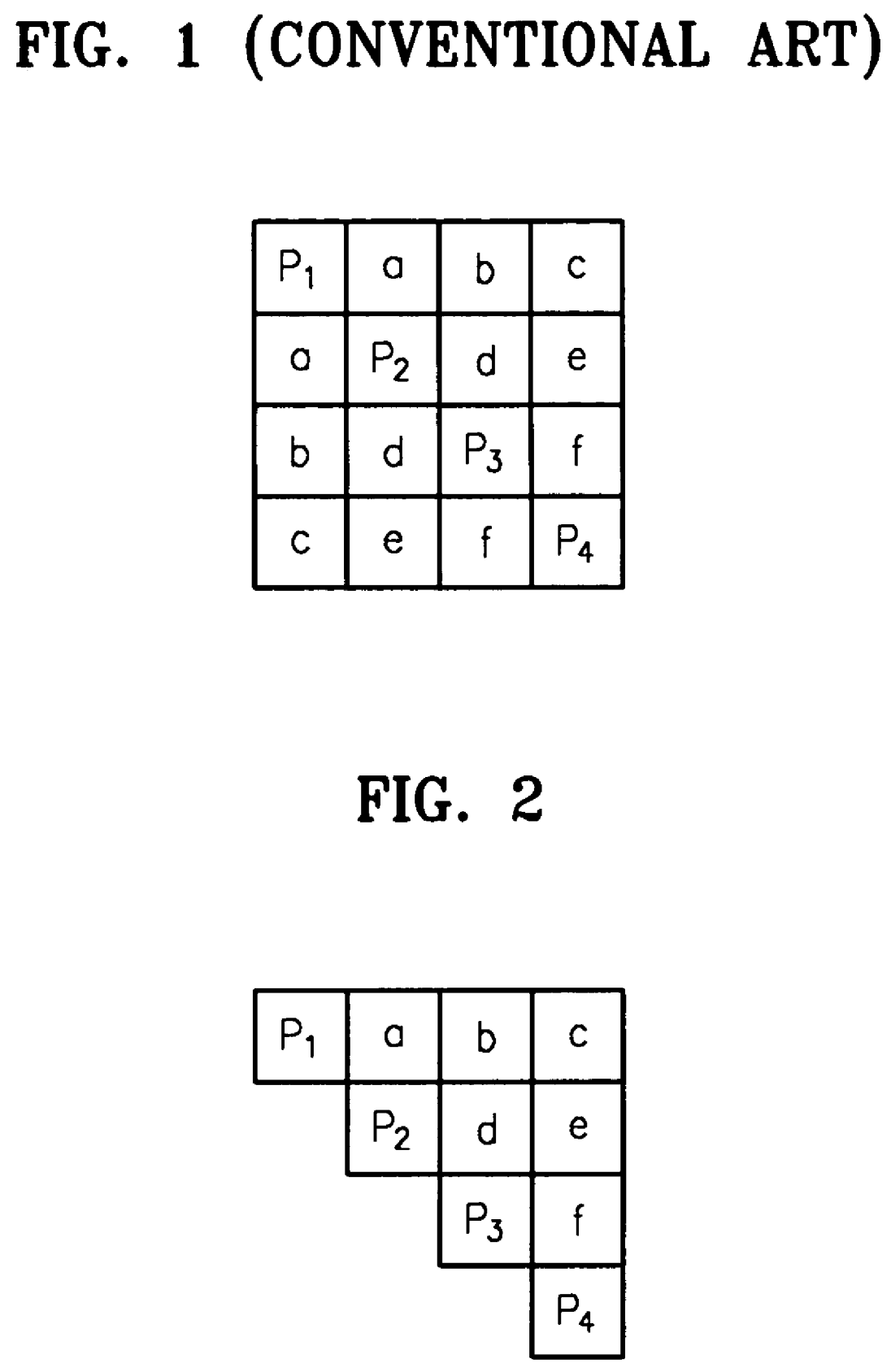

FIG. 1 illustrates the memory structure of a conventional error covariance matrix $\phi^{-1}(n)$. Referring to FIG. 1, the conventional error covariance matrix $\phi^{-1}(n)$, which is applied to a channel equalizer, has a symmetrical memory structure with respect to a diagonal line $P_1$, $P_2$, $P_3$ and $P_4$.

FIG. 2 illustrates the memory structure of an error covariance matrix $\phi^{-1}(n)$ according to an exemplary embodiment of the present invention. Referring to FIG. 2, only the upper-right portion of a memory of the error covariance matrix $\phi^{-1}(n)$, which is applied to a channel equalizer, with respect to a diagonal line $P_1$, $P_2$, $P_3$ and $P_4$ is used. For this reason, if the size of the memory of the conventional error covariance matrix $\phi^{-1}(n)$ is $N^2$, the size of the memory of the error covariance matrix $\phi^{-1}(n)$ according to the exemplary embodiments of the present invention will be about $0.5N^2$.

When the total amount of calculation of a conventional channel equalizer using the error covariance matrix of FIG. 1, shown in Equations IV, is $4N^2+7N$, the total amount of calculation of a channel equalizer using the error covariance matrix of FIG. 2, shown in Equations VI, is reduced to $1.5N^2+7N$.

An exemplary method of updating a tap coefficient of a channel equalizer and a circuit therefore, according to the present invention, to which Equation VI and the error covariance matrix of FIG. 2 are applied, will be explained in more detail below.

FIG. 3 is a block diagram of a channel equalizer 300 according to an exemplary embodiment of the present invention. As illustrated in FIG. 3, a filtering circuit 400 of the channel equalizer 300 includes an M-tap forward filter 410, an N-tap feedback filter 420, and an adder 430. It is believed that the structure and operation of the illustrated filtering circuit 400 will be well known to those skilled in the art and that detailed descriptions of the structure and operation are, therefore, unnecessary An exemplary circuit for updating a tap coefficient includes a subtracter 500, a decoder 510, a updating circuit 520, a determination circuit 540, a multiplexer 560, a training signal register 570 and a convergence examining and comparing unit 590 (a "CEC unit").

The M-tap forward filter 410 includes M filter cells (or taps) that are connected to one another in series. The M-tap forward filter 410 stores input data y(n) in the M filter cells, multiplies the respective data y(n) by corresponding equalizer coefficients c(n), and outputs the multiplication results to the adder 430.

The N-tap feedback filter 420 includes N filter cells (or taps) that are connected to one another in series. The N-tap feedback filter 420 stores respective output values s*(n) of the equalizer having an updated coefficient, i.e., signals output from the multiplexer 560, in the respective N filter cells, multiplies the data stored in the respective filter cells by corresponding equalizer coefficients c(n), and outputs the multiplication result to the adder 430.

The adder 430 adds signals output from the M-tap forward filter 410 and the N-tap feedback filter 420 together and outputs the addition result, i.e., a signal $y^{*T}(n)c(n-1)$, to the determination circuit 540 and the subtracter 500. The determination circuit 540, which may be a slicer, determines a value of the signal $y^{*T}(n)c(n-1)$ to a certain value and outputs the certain value to the multiplexer 560. The certain value corresponds to the output value s*(n) of the equalizer having an updated coefficient, i.e., the equalized output value s*(n).

The multiplexer 560 outputs a training signal stored in the training signal register 570 or the signal s*(n) output from the determination circuit 540 to the N-tap feedback filter 420, a forward error correction (FEC) circuit (not shown) and the subtracter 500, in response to a control signal CNTR. The subtracter 500 subtracts the signal $y^{*T}(n)c(n-1)$, which is output from the adder 430, from the signal s*(n) output from the multiplexer 560, and then outputs the subtraction result, i.e., an error signal e(n), to the CEC unit 590 and a third multiplier 5307.

The CEC unit 590 receives a threshold of visibility TOV and the error signal e(n) output from the subtracter 500, compares the threshold of visibility TOV with a square of the error signal e(n), and outputs the comparison result COMO to the decoder 510. The decoder 510 decodes the control signal CNTR and the comparison result COMO and outputs the decoding result EN/DEN to an error covariance register 5201, a Kalman gain register 5203, and a multiplexer 5211.

The updating circuit 520, which embodies the Kalman algorithm, includes the error covariance register 5201, the Kalman gain register 5203, a Kalman gain updating unit 5205, a first multiplier 5207, a subtracter 5209, the multiplexer 5211, a second multiplier 5309, the third multiplier 5307, an adder 5305, a coefficient updating register 5303 and a data register 5313.

It is possible to perform the LMS algorithm using the second multiplier 5309, the third multiplier 5307, the adder 5305, the coefficient updating register 5303 and the data register 5313. As indicated by reference numeral 530, these components comprise a circuit for performing the LMS algorithm.

The error covariance register 5201 stores an error covariance matrix $\phi^{-1}(n)$ and the Kalman gain register 5203 stores a Kalman gain K(n). The Kalman gain updating unit 5205 updates the Kalman gain K(n) in response to the Kalman gain K(n) output from the Kalman gain register 5203, a signal $\phi^{-1}(n-1)$ output from the error covariance register 5201, and data y(n) output from the data register 5313, and then outputs the updated Kalman gain K(n) to the Kalman gain register 5203.

The first multiplier 5207 receives the Kalman gain K(n) output from the Kalman gain register 5203, the signal $\phi^{-1}(n-1)$ output from the error covariance register 5201, and the data y(n) output from the data register 5313, multiplies them, and outputs the multiplication result to the subtracter 5209. The subtracter 5209 subtracts a signal output from the first multiplier 5207 from the signal $\phi^{-1}(n-1)$ output from the error covariance register 5201, and outputs the subtraction result to the error covariance register 5201.

The multiplexer 5211 outputs the Kalman gain K(n) output from the Kalman gain register 5203 or a signal output from the second multiplier 5309 to the third multiplier 5307, in response to the signal EN/DEN output from the decoder 510. The second multiplier 5309 receives a step size μ and the data y(n) output from the data register 5313, multiplies them, and outputs the multiplication result to the multiplexer 5211. The third multiplier 5307 receives the error signal e(n) output from the subtracter 500 and a signal output from the multiplexer 5211, multiplies them, and outputs the multiplication result to the adder 5305.

The adder 5305 receives a signal output from the third multiplier 5307 and a signal c(n−1) output from the coefficient updating register 5303, adds them together, and outputs the addition result to the coefficient updating register 5303. The coefficient updating register 5303 receives a signal output from the adder 5305, updates the coefficient of the equalizer based on the received signal, and outputs an updated coefficient c(n) to the M-tap forward filter 410 and the N-tap feedback filter 420. The data register 5313 receives and stores the input data y(n).

The operations of the error covariance register 5201 and the Kalman gain register 5203, which depend on the decoding result EN/DEN obtained by decoding the control signal CNRT and the signal COMO output from the CEC unit 590, are illustrated in T1 below:

T1

| control signal CNTR | Comparison result COMO $(e(n)^2 < TOV)$ | Error Covariance Register | Kalman Gain Register | algorithm used |
|---|---|---|---|---|
| training signal | 1 (convergence) | inactivation | inactivation | LMS |
| training signal | 0 (divergence) | activation | activation | Kalman |
| real data | 1 (convergence) | inactivation | inactivation | LMS |
| real data | 0 (divergence) | inactivation | inactivation | LMS |

As shown in T1, the comparison result COMO is 1 when the square of the error e(n) is smaller than the threshold of visibility TOV and is 0 when the square of the error e(n) is equal to or greater than the threshold of visibility TOV.

The decoder 510 decodes the control signal CNTR and the signal COMO output from the CEC unit 590 and determines whether the coefficient of the equalizer will be updated using the Kalman algorithm or the LMS algorithm.

When the error covariance register 5201 and the Kalman gain register 5203 are inactivated in response to the signal EN/DEN output from the decoder 510, the multiplexer 5211 outputs the signal output from the second multiplier 5309 to the third multiplier 5307 in order to update the coefficient of the equalizer using the LMS algorithm.

However, when the error covariance register 5201 and the Kalman gain register 5203 are activated in response to the signal EN/DEN output from the decoder 510, the multiplexer 5211 outputs the signal K(n) output from the Kalman gain register 5203 to the third multiplier 5307 in order to update the coefficient of the equalizer using the Kalman algorithm.

FIG. 4 is a flowchart illustrating a method of updating a coefficient of a channel equalizer according to an exemplary embodiment of the present invention. An exemplary method for updating a tap coefficient according to an exemplary embodiment of the present invention will be explained below with reference to FIGS. 3 and 4.

As shown in Equations III and IV, a signal, i.e., an error e(n), output from the subtracter 500 is expressed as the difference between a signal $y^{*T}(n)c(n-1)$ output from the adder 430 (or the equalizer) and a signal s*(n) output from the multiplexer 560. The signal s*(n) is a training signal or a signal output from the determination circuit 540.

First, in step 210, the CEC unit 590 determines whether the error e(n) of the channel equalizer 300 converges within the range of a threshold of visibility TOV and outputs the comparison result COMO. In detail, according to exemplary embodiments of the invention, the CEC unit 590 determines whether the square of the error e(n) converges within the range of the threshold of visibility TOV, as illustrated in T1, and outputs the comparison result COMO.

If the square of the error e(n) is smaller than the threshold of visibility TOV, i.e., converges, a signal output from the CEC unit 590 is activated, that is, the signal has a logic value of "1". If, however, the error e(n) falls outside the range of the threshold of visibility TOV, i.e., diverges, the error covariance register 5201 and the Kalman gain register 5203 are inactivated in response to signal EN/DEN output from the decoder 510. In this embodiment, the multiplexer 5211 is capable of outputting a signal output from the second multiplier 5309 to the third multiplier 5307 in response to the signal EN/DEN output from the decoder 510.

When the error e(n) converges, i.e., falls within the range of the threshold of visibility TOV, the updating circuit 520 updates the tap coefficient of the channel equalizer 300 using the LMS algorithm. As illustrated in FIG. 3, the second multiplier 5309 multiplies the step size μ by the data y(n) output from the data register 5313 and outputs the multiplication result to the multiplexer 5211. The multiplexer 5211 then outputs the signal output from the second multiplier 5309 to the third multiplier 5307 in response to the signal EN/DEN output from the decoder 510. The third multiplier 5307 multiplies a signal output from the multiplexer 5211 by the signal e(n) output from the subtracter 500 and outputs the multiplication result to the adder 5305.

The adder 5305 adds the signal c(n−1) output from the coefficient updating register 5303 and a signal output from the third multiplier 5307 and outputs the addition result c(n) to the coefficient updating register 5303. However, when the error e(n) does not converge within the range of the threshold of visibility TOV, the channel equalizer determines whether an input control signal CNTR is the training signal or not in step 220. If the control signal CNTR is the training signal, the updating circuit 520 updates the tap coefficient of the channel equalizer using the Kalman algorithm in step 230.

Referring to T1 and FIG. 4, in response to the signal EN/DEN output from the decoder 510, the error covariance register 5201 and the Kalman gain register 5203 are activated and the multiplexer 5211 outputs a signal output from the Kalman gain register 5203 to the third multiplier 5307. The third multiplier 5307 multiplies the signal K(n) output from the multiplexer 5211 by the signal e(n) output from the subtracter 500 and outputs the multiplication result to the adder 5305. The adder 5305 adds the signal c(n−1) output from the coefficient updating register 5303 and the signal output from the third multiplier 5307 and outputs the addition result c(n) to the coefficient updating register 5303.

If the control signal CNTR is not the training signal (for example, it is real data), the updating circuit 520 then updates the tap coefficient of the channel equalizer using the LMS algorithm in step 240.

After updating the coefficient of the equalizer using the LMS algorithm or the Kalman algorithm, the determination circuit 540 receives the signal $y^{*T}(n)c(n-1)$ output from the adder 430 and determines the signal $y^{*T}(n)c(n-1)$ as a certain value in step 250.

As described above, in an exemplary method for updating a tap coefficient of a channel equalizer and a circuit suitable for performing the method according to the present invention, a tap coefficient is selectively updated using either the Kalman algorithm or the LMS algorithm, thereby significantly reducing the amount of calculation required if only the Kalman algorithm was used while improving the performance that could be achieved using only a LMS algorithm.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of updating a tap coefficient of a channel equalizer, comprising:
   determining whether or not an error of the channel equalizer converges within a range of a threshold of visibility; and
   updating the tap coefficient of the channel equalizer using a least-mean-square (LMS) algorithm embodied in a circuit for performing the LMS algorithm:
   when the error converges within the range of the threshold of visibility; or
   when the error does not converge within the range of the threshold of visibility and a control signal is in a first state; or
   updating the tap coefficient of the channel equalizer using a Kalman algorithm embodied in a circuit for performing the Kalman algorithm:
   when the error does not converge within the range of the threshold of visibility and the control signal is in a second state;
   wherein the circuit for performing the LMS algorithm is part of the circuit for performing the Kalman algorithm.

2. The method of claim 1, wherein determining whether or not an error of the channel equalizer converges within a range of a threshold of visibility includes:
   determining whether a square of the error of the channel equalizer is smaller or larger than the threshold of visibility.

3. The method of claim 1, wherein the second state of the control signal is a training signal.

4. The method of claim 3, wherein the error is a difference between the training signal and a signal output from the channel equalizer.

5. The method of claim 1, wherein the error is a difference between a channel equalizer output signal and a determination circuit output signal, and
   wherein the determination circuit output signal has a certain value corresponding to the channel equalizer output signal.

6. The method of claim 1, wherein when the tap coefficient of the channel equalizer is updated using the LMS algorithm, the tap coefficient is updated with the following equation:

$$c(n)=c(n-1)+\mu e(n)y(n)$$

wherein c(n) denotes an updated tap coefficient vector of the channel equalizer,
   wherein c(n−1) denotes a tap coefficient vector of the channel equalizer updated to obtain c(n),
   wherein μ denotes a step size,
   wherein e(n) denotes the error of the channel equalizer, and
   wherein y(n) denotes data input to the channel equalizer.

7. The method of claim 1, wherein when the tap coefficient of the channel equalizer is updated using the Kalman algorithm, the tap coefficient is updated with the following equation:

$$c(n)=c(n-1)+K(n)e(n)$$

wherein c(n) denotes an updated tap coefficient vector of the channel equalizer,
   wherein c(n−1) denotes a tap coefficient vector of the channel equalizer updated to obtain c(n),
   wherein K(n) denotes a Kalman gain vector, and
   wherein e(n) denotes the error of the channel equalizer.

8. A circuit for updating a tap coefficient of a channel equalizer, comprising:
   a convergence examining and comparing (CEC) unit arranged and configured to determine if an error of the channel equalizer converges within a range of a threshold of visibility;
   a decoder arranged and configured to receive a control signal and an output signal of the CEC unit and to produce a decoder output signal; and
   an updating circuit arranged and configured to update the tap coefficient of the channel equalizer;
   wherein the updating circuit updates the tap coefficient using a least-mean-square (LMS) algorithm when the error converges within the range of the threshold of visibility or when the error does not converge within the range of the threshold of visibility and the decoder output signal is in a first state, and
   wherein the updating circuit updates the tap coefficient using a Kalman algorithm when the error does not converge within the range of the threshold of visibility and the decoder output signal is in a second state.

9. The circuit of claim 8, wherein the updating circuit updates the tap coefficient of the channel equalizer using the Kalman algorithm only when the second state of the decoder output signal is a training signal.

10. The circuit of claim 8, wherein the updating circuit is arranged and configured to update the tap coefficient of the channel equalizer using the LMS algorithm with the following equations:

$$c(n)=c(n-1)+\mu e(n)y(n)$$

wherein c(n) denotes an updated tap coefficient vector of the channel equalizer,
   wherein c(n−1) denotes a tap coefficient vector of the channel equalizer updated to obtain c(n),
   wherein μ denotes a step size,
   wherein e(n) denotes the error of the channel equalizer, and
   wherein y(n) denotes data input to the channel equalizer.

11. The circuit of claim 8, wherein the updating circuit is arranged and configured to update the tap coefficient of the channel equalizer using the Kalman algorithm with the following equation:

$$c(n)=c(n-1)+K(n)e(n)$$

wherein c(n) denotes an updated tap coefficient vector of the channel equalizer,
   wherein c(n−1) denotes a tap coefficient vector of the channel equalizer updated to obtain c(n),
   wherein K(n) denotes a Kalman gain vector, and
   wherein e(n) denotes the error of the channel equalizer.

12. A circuit for updating a tap coefficient of a channel equalizer, comprising:
   the channel equalizer arranged and configured to produce a channel equalizer output signal;
   a slicer arranged and configured to determine a certain value corresponding to the channel equalizer output signal and to generate a slicer output signal corresponding to the certain value;
   a selection circuit arranged and configured to receive a control signal, the slicer output signal, and a training signal, and, in response to the control signal, to output the slicer output signal or the training signal as a selection circuit output signal;

a subtracter arranged and configured to subtract the channel equalizer output signal from the selection circuit output signal and to generate an error output signal;

a convergence examining and comparing (CEC) unit arranged and configured to compare a range of a threshold of visibility with the error output signal and to generate a first CEC output signal when the error output signal converges within the range of the threshold of visibility or a second CEC output signal when the error output signal does not converge within the range of the threshold of visibility;

a decoder arranged and configured to receive the control signal and the output signal of the CEC unit and to produce a decoder output signal; and an updating circuit arranged and configured to update the tap coefficient of the channel equalizer in response to the decoder output signal;

wherein the updating circuit updates the tap coefficient of the channel equalizer:
  using a LMS algorithm when the decoder output signal is in a first state; and
  using a Kalman algorithm when the decoder output signal is in a second state.

13. The circuit of claim 12, wherein the decoder output signal is in the first state when the error output signal converges within the range of the threshold of visibility or the control signal is in a third state, and
  wherein the decoder output signal is in the second state when the error output signal does not converge within the range of the threshold of visibility and the control signal is in a fourth state.

14. The circuit of claim 13, wherein when the control signal is in the fourth state, the selection circuit output signal is the training signal.

15. The circuit of claim 12, wherein a first portion of the updating circuit is arranged and configured to update the tap coefficient of the channel equalizer using the LMS algorithm with the following equation:

$$c(n)=c(n-1)+\mu e(n)y(n)$$

and
  wherein a second portion of the updating circuit is arranged and configured to update the tap coefficient of the channel equalizer using the Kalman algorithm with the following equation:

$$c(n)=c(n-1)+K(n)e(n)$$

wherein c(n) denotes an updated tap coefficient vector of the channel equalizer, wherein c(n−1) denotes a tap coefficient vector of the channel equalizer updated to obtain c(n), wherein μ denotes a step size, wherein e(n) denotes an error of the channel equalizer, wherein y(n) denotes data input to the channel equalizer, and wherein K(n) denotes a Kalman gain vector.

16. A circuit for updating a tap coefficient of a channel equalizers, comprising:
  the channel equalizer arranged and configured to produce a channel equalizer output signal;
  means for generating a determination signal corresponding to a value of the channel equalizer output signal;
  means for receiving a control signal, the determination signal, and a training signal and for selectively outputting the determination signal or the training signal;
  means for generating an error signal;
  means for comparing the error signal to a threshold of visibility and for generating a comparator output signal;
  means for receiving the control signal and the comparator output signal and for producing a decoder output signal; and
  means for selectively updating the tap coefficient using a least-mean-square (LMS) algorithm or a Kalman algorithm based on the decoder output signal.

17. The circuit of claim 16, wherein the means for generating the determination signal is a slicer,
  wherein the means for receiving the control signal, the determination signal, and the training signal is a multiplexer,
  wherein the means for generating the error signal is a subtracter, and
  wherein the means for comparing the error signal to the threshold of visibility and for generating the comparator output signal is a convergence examining and comparing unit.

* * * * *